(12) United States Patent

Hu et al.

(10) Patent No.: US 12,674,715 B2
(45) Date of Patent: Jul. 7, 2026

(54) SENSOR ASSEMBLY AND VALVE DEVICE

(71) Applicant: ZHEJIANG SANHUA AUTOMOTIVE COMPONENTS CO., LTD., Hangzhou (CN)

(72) Inventors: Shifeng Hu, Hangzhou (CN); Run Chen, Hangzhou (CN); Zheng Cao, Hangzhou (CN); Kezhe Qian, Hangzhou (CN); Rongrong Zhang, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 431 days.

(21) Appl. No.: 18/267,554

(22) PCT Filed: Dec. 15, 2021

(86) PCT No.: PCT/CN2021/138250

§ 371 (c)(1),
(2) Date: Jun. 15, 2023

(87) PCT Pub. No.: WO2022/127810

PCT Pub. Date: Jun. 23, 2022

(65) Prior Publication Data

US 2024/0044734 A1    Feb. 8, 2024

(30) Foreign Application Priority Data

Dec. 15, 2020    (CN) .......................... 202011478788.9
Dec. 29, 2020    (CN) .......................... 202011589518.5

(51) Int. Cl.
G01L 19/00        (2006.01)
G01L 19/14        (2006.01)

(52) U.S. Cl.
CPC ...... G01L 19/0092 (2013.01); G01L 19/0084 (2013.01); G01L 19/142 (2013.01)

(58) Field of Classification Search
CPC ............. G01L 19/0092; G01L 19/0084; G01L 19/142
See application file for complete search history.

(56) References Cited

U.S. PATENT DOCUMENTS 5,948,989 A    9/1999    Ichikawa et al.
5,974,893 A    11/1999    Balcarek et al.
(Continued)

FOREIGN PATENT DOCUMENTS

CN    101285726 A    10/2008
CN    102124313 A    7/2011
(Continued)

OTHER PUBLICATIONS

English translation of KR102006750, accessed from iq.ip.com (Year: 2019).*
(Continued)

*Primary Examiner* — Kristina M Deherrera
*Assistant Examiner* — Jean F Morello
(74) *Attorney, Agent, or Firm* — Yue (Robert) Xu; Apex Attorneys at Law, LLP

(57)    ABSTRACT

A sensor assembly and a valve device, the sensor assembly including a temperature sensing unit, a pressure sensing unit, a circuit unit, a housing and a connector. The housing is fixedly connected to a connector housing, and the pressure sensing unit and the circuit unit are limited between the bottom wall of the housing and the connector housing, thereby facilitating simplification of the structure and reducing production costs.

18 Claims, 13 Drawing Sheets

(56) References Cited

U.S. PATENT DOCUMENTS

| | | | |
|---|---|---|---|
| 9,631,991 B2 * | 4/2017 | Tohyama | G01L 9/0044 |
| 2005/0229708 A1 | 10/2005 | Nomura | |
| 2008/0216580 A1 | 9/2008 | Kuznia et al. | |
| 2008/0250862 A1 | 10/2008 | Nakabayashi et al. | |
| 2011/0138924 A1 | 6/2011 | Colombo et al. | |
| 2016/0091377 A1 | 3/2016 | Tohyama et al. | |
| 2017/0288346 A1 | 10/2017 | Wirnitzer et al. | |

FOREIGN PATENT DOCUMENTS

| | | |
|---|---|---|
| CN | 103047416 A | 4/2013 |
| CN | 202971904 U | 6/2013 |
| CN | 106688147 A | 5/2017 |
| CN | 110068416 A | 7/2019 |
| CN | 209623933 U | 11/2019 |
| CN | 210893467 U | 6/2020 |
| CN | 211602261 U | 9/2020 |
| CN | 211877068 U | 11/2020 |
| CN | 212133969 U | 12/2020 |
| JP | H08178779 A | 7/1996 |
| JP | H1194668 A | 4/1999 |
| JP | H11295174 A | 10/1999 |
| JP | 2010121637 A | 6/2010 |
| JP | 2013002621 A | 1/2013 |
| JP | 2013015476 A | 1/2013 |
| JP | 2016070813 A | 5/2016 |
| KR | 102006750 B1 | 8/2019 |

OTHER PUBLICATIONS

English translation of KR102006750, accessed from iq.ip.com.*

The European search report issued on Sep. 24, 2024 for EP21905737.9.

The Japanese 1st Office Action issued on Jul. 30, 2024 for JP2023-535651.

International Search Report for PCT/CN2021/138250 mailed Mar. 9, 2022, ISA/CN.

The 1st Office Action dated Jul. 8, 2025 for the Chinese Patent Application No. CN202011589518.5. English Translation of the 1st Office Action.

The 1st Office Action dated Aug. 2, 2025 for the Chinese Patent Application No. CN202011587762.8. English Translation of the 1st Office Action.

The 1st Office Action dated Aug. 2, 2025 for the Chinese Patent Application No. CN202011587536.X. English Translation of the 1st Office Action.

* cited by examiner

SENSOR ASSEMBLY AND VALVE DEVICE

This application is a National Phase entry of PCT Application No. PCT/CN2021/138250, filed on Dec. 15, 2021, which claims the benefits of priorities to the following two Chinese patent applications, both of which are incorporated herein by reference, 1) Chinese Patent Application No. 202011478788.9, titled "SENSOR ASSEMBLY AND VALVE DEVICE", filed with the China National Intellectual Property Administration on Dec. 15, 2020; and 2) Chinese Patent Application No. 202011589518.5 titled "SENSOR ASSEMBLY AND VALVE DEVICE", filed with the China National Intellectual Property Administration on Dec. 29, 2020.

FIELD

The present application relates to the technical field of detection, and in particular to a sensor assembly and a valve device using the sensor assembly.

BACKGROUND

As shown in FIG. 24, a sensor assembly 100 in the related technology includes a pressure sensor element 130, an electronic circuit board 120, and a temperature sensor element 170. The sensor assembly 100 delivers fluid to the surface of the pressure sensor element 130 through the inlet opening 175 of an open liquid-tight channel, where the pressure sensor element 130 is used to sense pressure, and separates the temperature sensor 170 and the wire 160 from the fluid through a closed liquid-tight channel. The wire 160 extends in the slender tubular element 165 and is connected to the electronic circuit board 120 from the side through the hole of the base.

The sensor assembly with this structure has too many parts, complicated assembly process and high production cost.

SUMMARY

An object of the present application is to provide a sensor assembly and a valve device with a simple structure and beneficial to reducing production costs.

To achieve the above object, the following technical solutions are provided according to the present application: a sensor assembly includes a shell, a temperature sensing unit, a pressure sensing unit and a circuit unit, the temperature sensing unit includes a temperature sensing part, the pressure sensing unit includes a pressure sensing part, the sensor assembly has a detection channel, the temperature sensing part, which is located in the detection channel, can convert the temperature in the detection channel into an electrical signal, the pressure sensing part can convert the pressure in the detection channel into an electrical signal; the temperature sensing unit further includes a conductive part, the conductive part is electrically connected with the temperature sensing part and the circuit unit, the sensor assembly further includes a connector, the connector includes a contact pin and a connector housing, the contact pin is electrically connected with the circuit unit, the shell is fixedly connected with the connector housing, the pressure sensing unit is limited between a bottom wall of the shell and the connector housing, the connector housing includes a limiting part, the limiting part can abut against an upper end face of the pressure sensing unit.

A valve device is further disclosed according to the present application, which includes a valve body and a sensor assembly, the valve body has a fluid channel, the detection channel is communicated with the fluid channel, the sensor assembly is the sensor assembly described above.

In the sensor assembly and the valve device of the present application, the sensor assembly includes the pressure sensing unit, the temperature sensing unit, the circuit unit and the connector. The shell is fixedly connected with the connector housing, the pressure sensing unit and the circuit unit are limited between the bottom wall of the shell and the connector housing, which is conducive to reducing the number of parts, simplifying the structure and reducing the production cost.

DETAILED DESCRIPTION OF THE EMBODIMENTS

Figure 1:
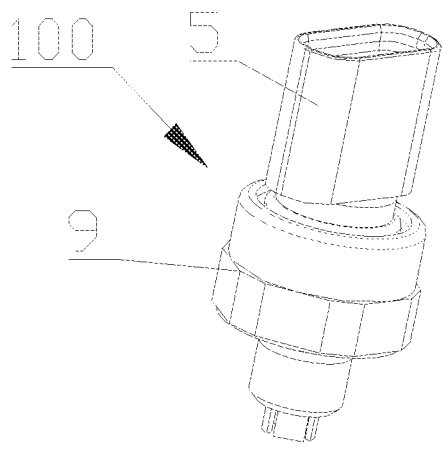
FIG. 1 is a schematic perspective view of a sensor assembly according to a first embodiment of the present application.
Figure 2:
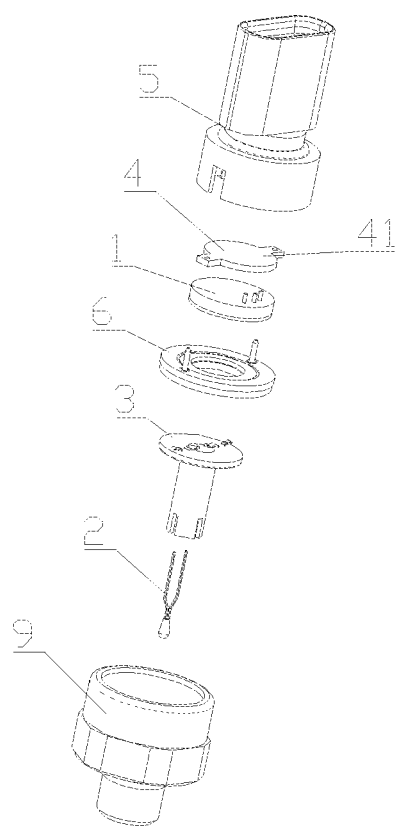
FIG. 2 is an exploded structural diagram of the sensor assembly of FIG. 1.

The present application is further illustrated hereinafter in conjunction with drawings and specific embodiments.

It should be understood that words such as "first", "second" and the like used in the specification and claims of this application do not indicate any order, quantity or importance, but are only used to distinguish the naming of features. Likewise, the terms such as "a(n)" or "one" do not indicate a quantitative limitation, but rather indicate presence of at least one. Unless otherwise specified, similar words such as "front", "rear", "left", "right", "upper" and "lower" appear in this application only for convenience of explanation, and are not limited to a specific position or a spatial orientation. Similar words such as "including" or "containing" are an open expression, which means that the elements before "including" or "containing" now cover the elements that appear after "including" or "containing" and their equivalents, which does not exclude that the elements that appear before "including" or "containing" can also contain other elements. If "multiple" appears in this application, it means two or more.

Referring to FIG. 1 to FIG. 16, a sensor assembly 100 provided by the present application includes a pressure sensing unit 1, a temperature sensing unit 2, a circuit unit 4, a connector 5, a sealing assembly 6 and a shell 9; the circuit unit 4 is located at one side of the pressure sensing unit 1, the sealing assembly 6 is located at the other side of the pressure sensing unit 1, in FIG. 1 to FIG. 10, the circuit unit 4 is located above the pressure sensing unit 1, the sealing assembly 6 is located below the pressure sensing unit 1, both the temperature sensing unit 2 and the pressure sensing unit 1 are electrically connected with the circuit unit 4, the shell 9 and the connector 5 are fixedly connected to form an accommodating cavity 59, the pressure sensing unit 1 and the circuit unit 4 are located in the accommodating cavity 59, the sensor assembly 100 has a detection channel 101; the temperature sensing unit 2 includes a temperature sensing part 21, at least part of the temperature sensing part 21 is located in the detection channel 101, the temperature sensing part 21 can convert the temperature in the detection channel 101 into an electrical signal, the temperature sensing part 21 can be a thermistor, and the type of the temperature sensing part 21 in the present application is not limited to this; the pressure sensing unit 1 includes a pressure sensing part 20 and a body part 10, the body part 10 can be a ceramic substrate, and the pressure sensing part 20 is connected with the body part 10, the pressure sensing part 20 can convert the pressure in the detection channel 101 into an electrical signal, the accommodating cavity 59 includes an electric control cavity 591, the circuit unit 4 is located in the electric control cavity 591, the electric control cavity 591 is separated from the detection channel 101; in this embodiment, the sealing assembly 6 is located between the shell 9 and the pressure sensing unit 1, the sealing assembly 6 includes a sealing part 61, the sealing part 61 is pressed between the pressure sensing unit 1 and the shell 9, the sealing part 61 is in sealing contact with the pressure sensing unit 1, the sealing part 61 is in sealing contact with the shell 9, so that the working medium of the detection channel 101 cannot enter the electric control cavity 591, the space where the circuit unit is located is sealed by a sealing assembly, so that the circuit unit cannot contact the measured working medium, and the sealing performance is reliable and the structure is simple.

The temperature sensing unit 2 further includes a conductive part 22 and a base 3, the conductive part 22 is electrically connected with the temperature sensing part 21 and the circuit unit 4, at least part of the conductive part 22 is connected with the base 3 by injection molding, at least part of the sealing part 61 is located between the base 3 and the pressure sensing unit 1.

Referring to FIG. 5 to FIG. 8, in this embodiment, the sealing assembly 6 includes a sealing part 61 and a metal framework 62, a main material of the sealing part 61 is rubber, the sealing part 61 is formed by injection molding with the metal framework 62 as an insert, and the metal framework 62 is of an annular shape. In a radial direction of the sealing assembly 6, an outer edge of the metal framework 62 is aligned with an outer edge of the sealing part 61, the alignment described here may include certain assembly error, the assembly error can be within 1 mm, along a height direction of the sealing assembly 6, the sealing part 61 protrudes from the surface of the metal framework 62, and the pressure sensing unit 1 can contact the metal framework 62 after compressing the sealing part 61, the metal framework 62 presses the sealing part 61 against the bottom wall of the shell 9.

The sealing assembly 6 has a first through hole 63, the temperature sensing part 21 is electrically connected with the circuit unit 4 through the conductive part 22, the conductive part 22 includes a first section 221, and, an end of the first section 221 passes through the first through hole 63 and is electrically connected with the circuit unit 4, a first flange part 23 is formed at the other end of the first section 221, an outer diameter of the first flange part 23 is larger than an aperture of the first through hole 63, and a labyrinth structure is formed between the sealing part 61 and the first section 221 of the conductive part 22, thus improving the sealing performance.

The conductive part 22 further includes a second section 222 and a third section 223, the second section 222 is located between the first section 221 and the third section 223, and, the second section 222 is electrically connected to the first section 221 and the third section 223. In this embodiment, the second section 222 is connected with the base 3 by injection molding, the second section 222 is in an elastic contact with and electrically connected with the first section 221; in this embodiment, an arc-shaped protrusion 220 is formed at one end of the second section 222 by bending or stamping, the arc-shaped protrusion 220 has certain elasticity, a planar part 230 is formed at the other end of the second section 222, the first flange part 23 of the first section 221 abuts against the arc-shaped protrusion 220 to form electrical connection, the third section 223 is fixed to the planar part 230 by welding, and a through hole can be defined in the planar part 230. The third section 223 is inserted into the through hole and fixed by welding. The planar part 230 extends into a corresponding area of the inner cavity of the base 3, so that an insertion end of the third section 223 can be straight and has a simple structure. The third section 223 is fixedly connected with the temperature sensing part 21, and one end of the third section 223 is connected with the temperature sensing part 21.

Figures 3, 4:
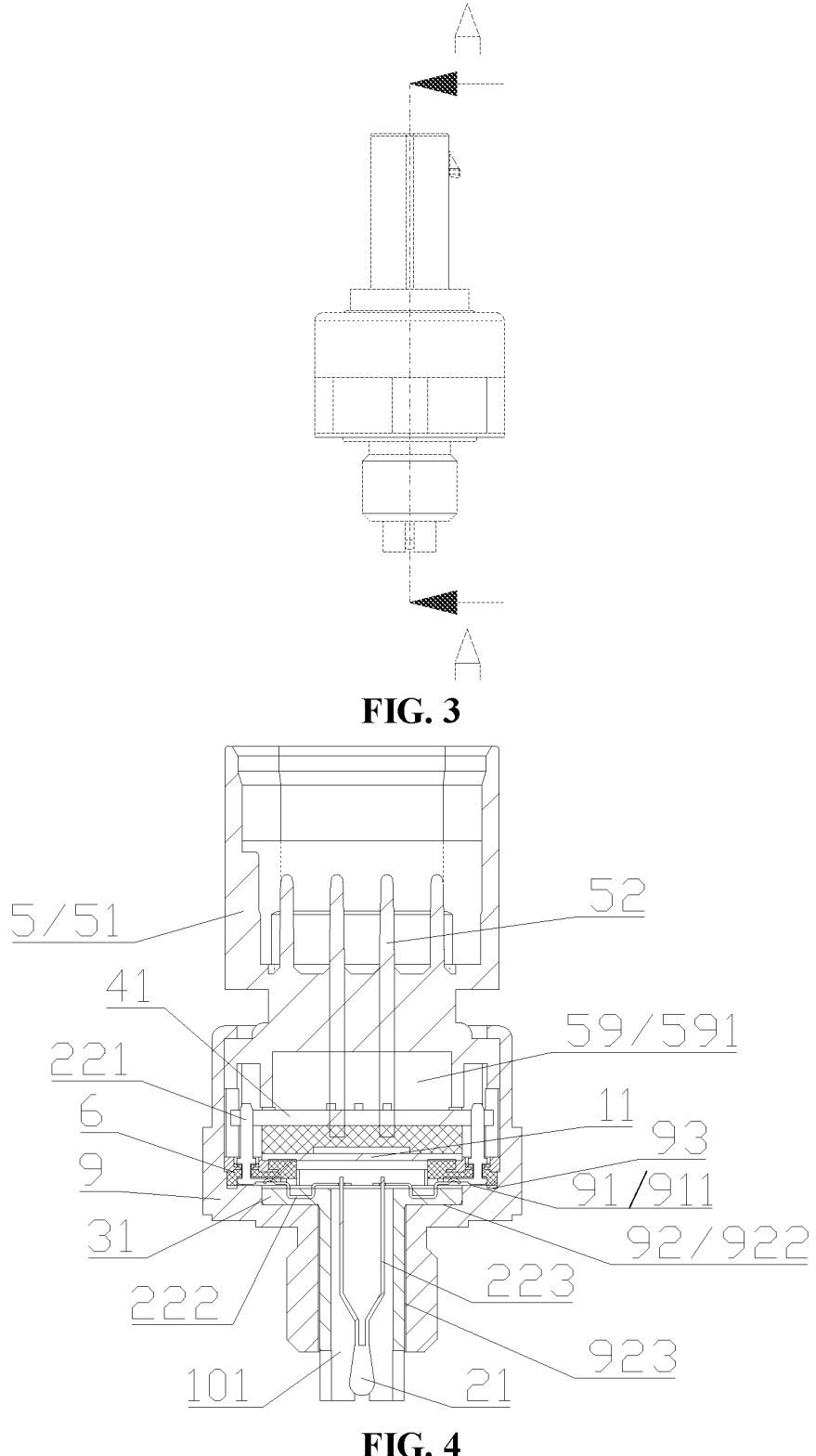
FIG. 3 is a schematic front view of the sensor assembly of FIG. 1.
FIG. 4 is a schematic sectional view of FIG. 3 taken along line A-A.
Figure 5:
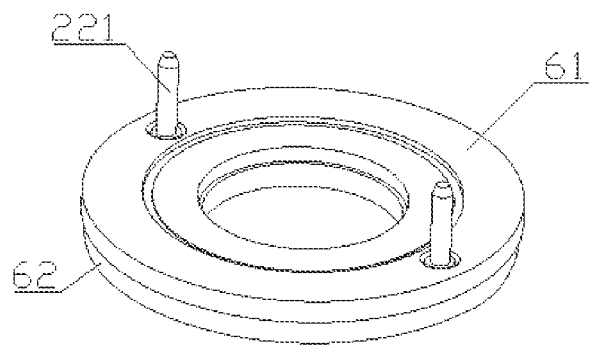
FIG. 5 is a three-dimensional structure diagram of a combination of a sealing assembly and a first section in FIG. 2 from a viewing angle.
Figure 6:
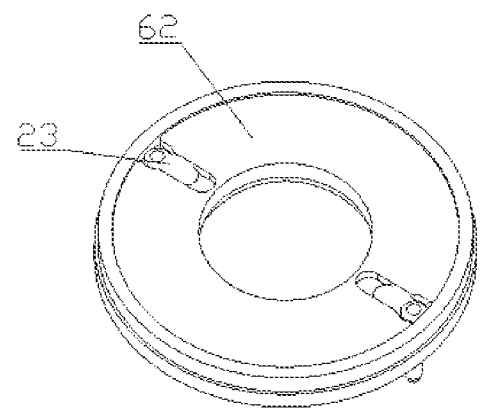
FIG. 6 is a three-dimensional structure diagram of the combination of a sealing assembly and the first section in FIG. 2 from another viewing angle.
Figure 7:
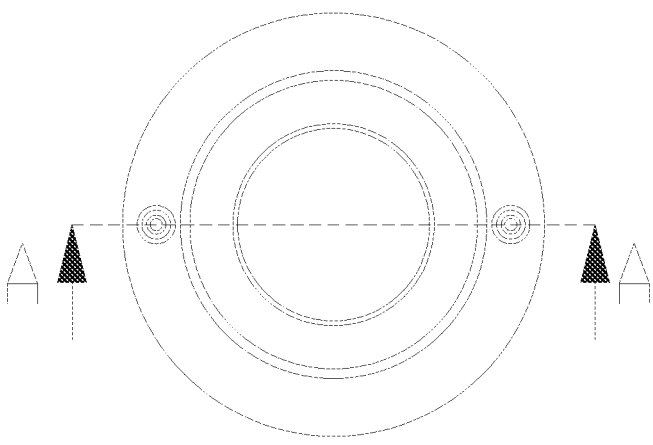
FIG. 7 is a schematic top view of the structure in FIG. 5.
Figure 8:
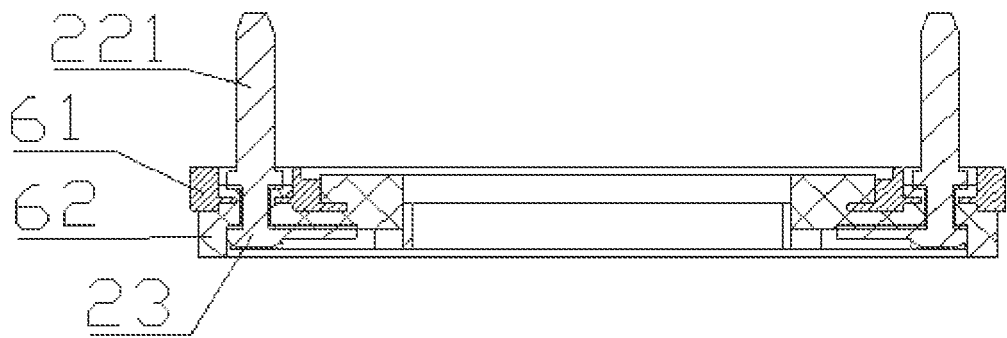
FIG. 8 is a schematic sectional view of FIG. 7 taken along line A-A.
Figure 9:
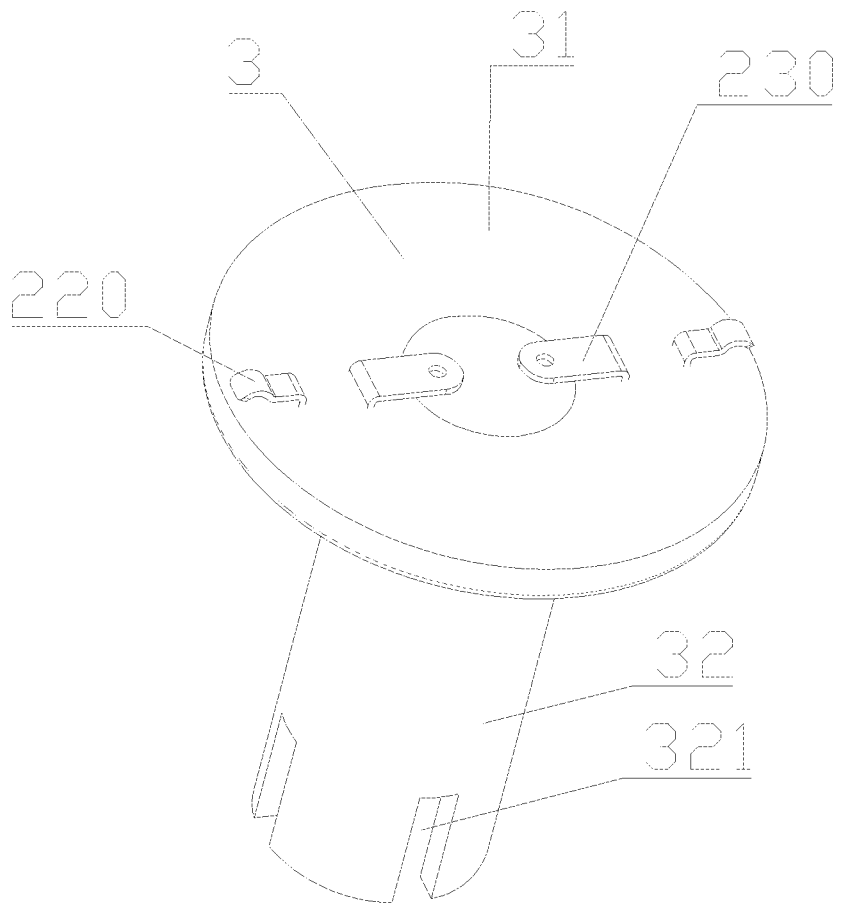
FIG. 9 is a three-dimensional structure diagram of a combination of a base and a second section in FIG. 2 from a viewing angle.

Referring to FIG. 4 and FIG. 9, part of the second section 222 is fixed with the base 3 by injection molding, the base 3 has a second flange part 31 and a cylindrical part 32, an outer edge size of the second flange part 31 is larger than an outer edge size of the cylindrical part 32, the second flange part 31 is provided to protrude from the cylindrical part 32, an upper end face of the second flange part 31 abuts against a lower end face of the sealing assembly 6, a lower end face of the second flange part 31 is in contact with a bottom wall of the shell 9, an upper end face of the sealing assembly 6 abuts against and is hermetically connected with a lower end face of the pressure sensing unit 1. The cylindrical part 32 has a notch part 321, a height of the notch part 321 is the same as a height of the temperature sensing part 21, the notch part 321 is communicated with an inner cavity of the base 3 (i.e., the detection channel 101), so that the working medium can enter the detection channel 101 through the notch part 321. In this embodiment, there are four notched parts 321, which are evenly distributed along a circumferential direction of the cylindrical part 32; both the arc-shaped protrusion 220 and the planar part 230 protrude from the upper end face of the second flange part 31, both the arc-shaped protrusion 220 and the planar part 230 protrude from the upper end face of the second flange part 31. The cylindrical part 32 forms a part of the side wall of the detection channel 101.

Referring to FIG. 4 in combination, the shell 9 has a first step part 91 and a second step part 92, the first step part 91 and the second step part 92 are located at the bottom wall of the shell 9, the first step part 91 has a first step surface 911, the second step part 92 has a second step surface 922, the first step surface 911 is closer to the pressure sensing unit 1 than the second step surface 922, the lower end face of the sealing part 61 is hermetically connected with the first step surface 911, the first flange part 23 of the first section 221 can abut against the first step surface 911 to limit the position, so as to prevent the first flange part 23 from crushing the arc-shaped protrusion 220; the second step part 92 has a mounting hole 923, the second flange part 31 abuts against the second step surface 922 for axial limit, and is laterally limited by a side wall of the second step part 92, the cylindrical part 32 of the base 3 is located in the mounting hole 923, at least part of the notch 321 is exposed from the shell 9. In this embodiment, the shell 9 is further provided with a third step surface 93, the metal framework 62 abuts against the third step surface 93, which can prevent the metal framework 62 from compressing the sealing part 61 with excessive deformation or even crushing.

Figure 10:
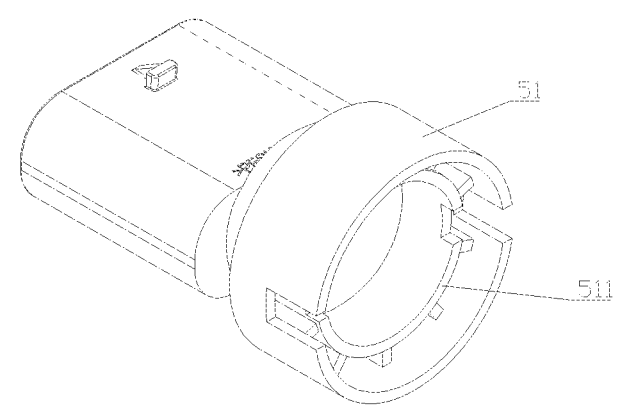
FIG. 10 is a three-dimensional structure diagram of a connector in FIG. 2.

Referring to FIG. 4 and FIG. 10 in combination, the connector 5 includes a contact pin 52 and a connector housing 51, the contact pin 52 is electrically connected with the circuit unit 4, the contact pin 52 can be electrically connected with the circuit unit 4 and an external power supply, the contact pin 52 is fixed with the connector housing 51 by injection molding, the shell 9 is fixedly connected with the connector housing 51; in this embodiment, the shell 9 and the connector housing 51 are fixedly connected by riveting, the connector housing 51 includes a limiting part 511, the limiting part 511 can abut against an upper end face of the pressure sensing unit 1. In an embodiment, in order to prevent the sealing performance of the sensor assembly from being affected by the deformation of the parts caused by the temperature change, the limiting part 511 does not directly contact with the circuit board where the circuit unit is located, the limiting part 511 avoids the circuit board where the circuit unit is located and abuts against the pressure sensing unit 1, and the limiting part 511 can be a limiting column or an annular part with a notch; referring to FIG. 10, the limiting part 511 is an annular part with a notch, the shell 9 is fixedly connected with the connector housing 51; the limiting part 511 abuts against the pressure sensing unit 1, the lower end face of the pressure sensing unit 1 abuts against the upper end face of the sealing assembly 6, the lower end face of the sealing assembly 6 abuts against the upper end face of the second flange part 31 and the first step surface 911 of the shell 9, the lower end face of the second flange part 31 is in contact with the bottom wall of the shell 9, so that the shell 9 is fixedly connected with the connector housing 51, and the circuit unit 4 is sealed in the electric control cavity 591, which is convenient to mount. Compared with the solution where two sealing rings need to be mounted, the assembly of the present application has only one sealing part, and the structure is simple, the sealing part is integrally formed, so the material is the same, the temperature consistency is good, and the sealing reliability is improved.

Figure 11:
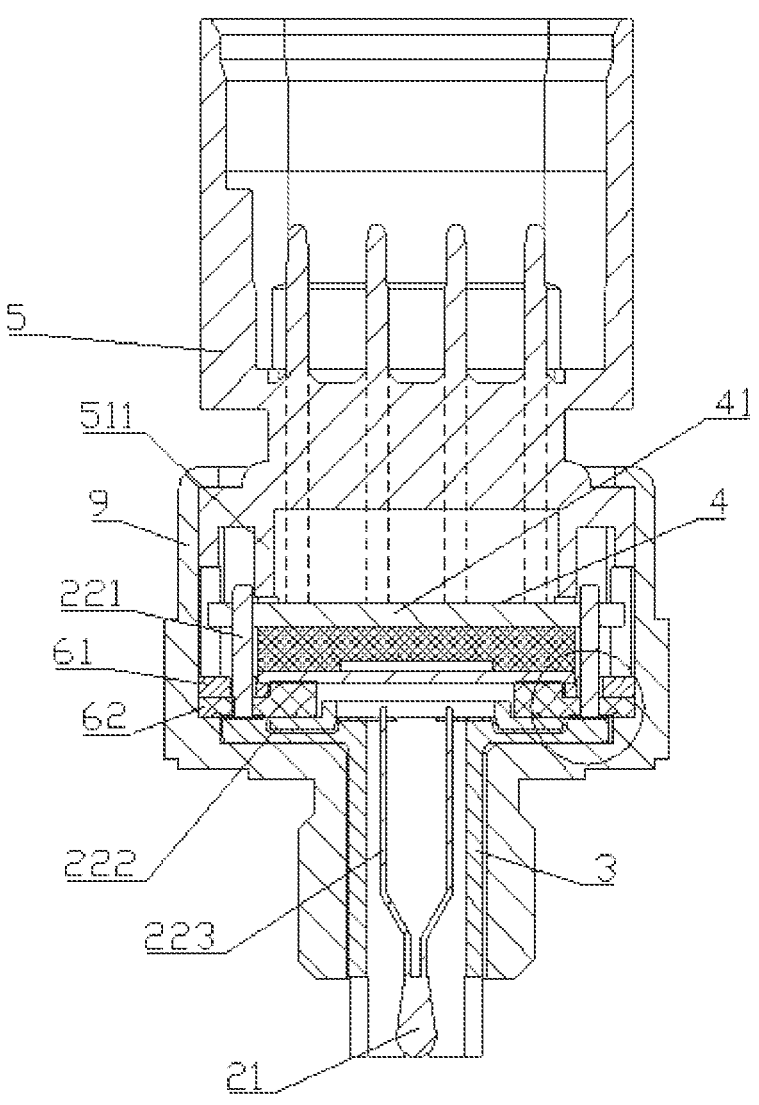
FIG. 11 is a schematic sectional view of the sensor assembly according to a second embodiment of the present application.
Figure 12:
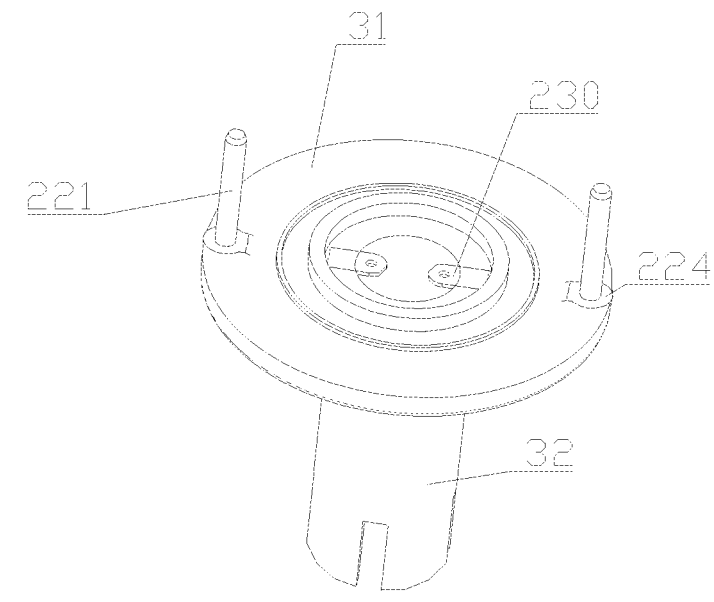
FIG. 12 is a three-dimensional structure diagram of the base in FIG. 11 from a viewing angle.
Figure 13:
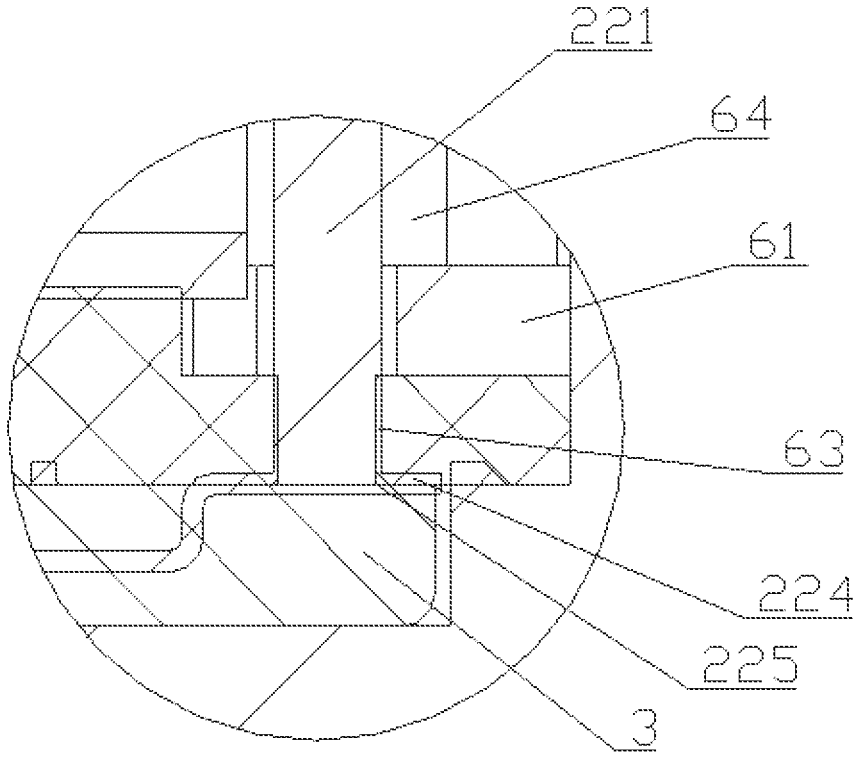
FIG. 13 is an enlarged schematic diagram of a partial structure of the base in FIG. 11.

FIG. 11 to FIG. 13 show a second embodiment of the sensor assembly 100, the second embodiment is mainly different from the first embodiment in that: the first section 221 and the second section 222 of the conductive part 22 are connected in different ways; in this embodiment, the first section 221 and the second section 222 of the conductive part are fixedly connected, which is a rigid connection. Specifically, the two sections can be welded; in this embodiment, the second section 222 is connected with the base 3 by injection molding, one end of the second section 222 has an extension part 224 exposed out of the base 3, a first groove 225 is formed in the extension part 224, and the first groove 225 is a blind hole. The end of the first section 221 extends into the first groove 225 for axial limit or as a reference for assembly and positioning, and the first section 221 and the second section 222 are connected by welding. The first section 221 and the second section 222 are electrically connected, a dimension of an outer edge of the extension part 224 is larger than an aperture of the first through hole 63, an upper end face of the extension part 224 is in sealing contact with the sealing part 61, a lower end face of the extension part 224 is fixed to the base 3 by injection molding.

FIG. 15 to FIG. 18 show a third embodiment of the sensor assembly 100, the main differences from the first embodiment are as follows: in this embodiment, the sealing assembly 6 does not include a metal framework, the sealing part has a first through hole 63, the pressure sensing unit 1 has a second through hole 64, the first section 221 of the conductive part 22 is mechanically and electrically connected to the circuit unit 4 through two through holes, namely, the first through hole 63 of the sealing part and the second through hole 64 of the pressure sensing unit; the upper end face of the first flange part 23 of the first section 221 abuts against the lower end face of the sealing part 61, a lower end face of the first flange part 23 is limitedly connected with the base 3, the second section 222 includes a vertical section 226, the vertical section 226 abuts against and is electrically connected with the first flange part 23, the pressure sensing unit of this embodiment may also be used in the sensor assembly 100 of the first embodiment. Compared with the first embodiment, the metal framework is saved, which is beneficial to further reducing the cost. In this embodiment, the base 3 further includes a limit ring 33, there is a gap between the upper end face of the limit ring 33 and the lower end face of the pressure sensing unit 1, the sealing part 61 is annular, and is located between the limit ring 33 and the side wall of the shell 9.

Figure 14:
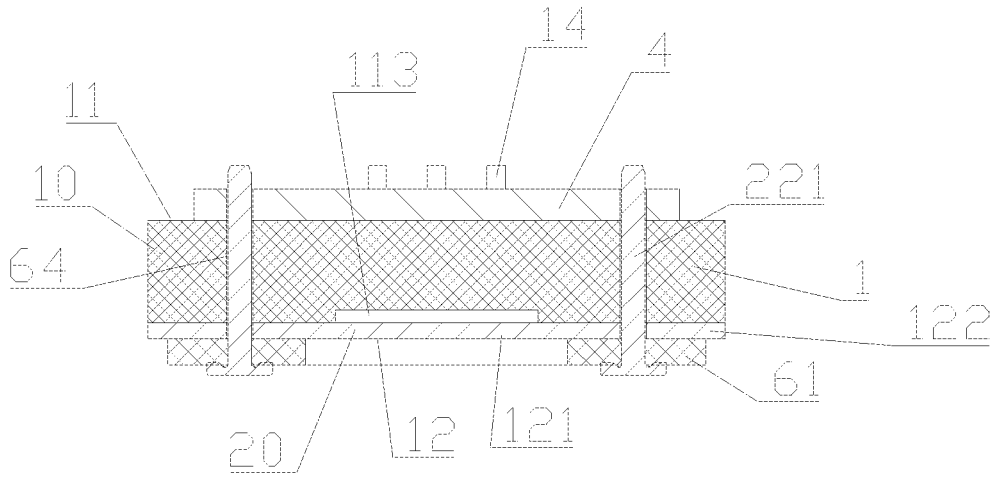
FIG. 14 is a schematic sectional view of a first embodiment of a pressure sensing unit of the present application.
Figure 19:
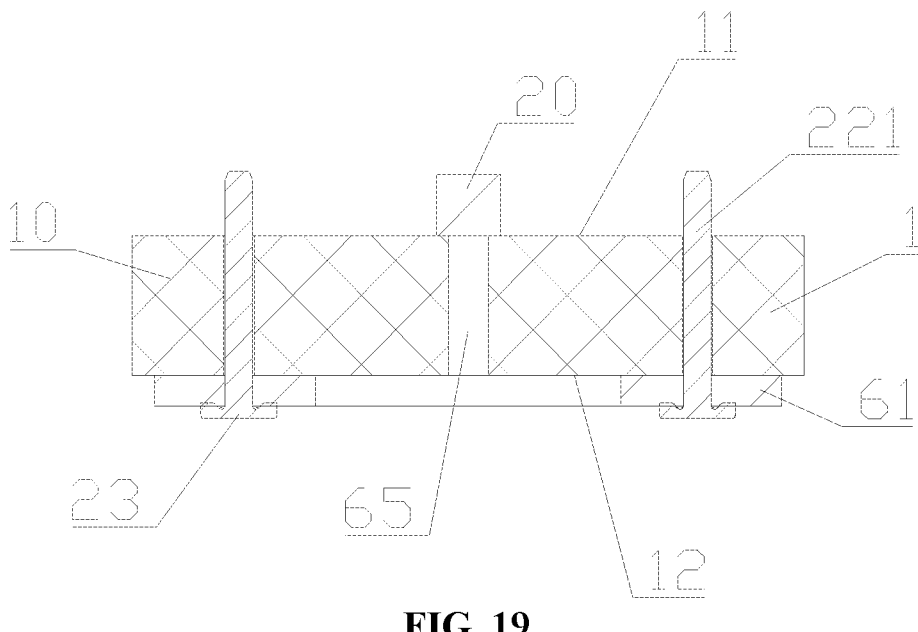
FIG. 19 is a schematic sectional view of a second embodiment of the pressure sensing unit of the present application.

Referring to FIG. 14 and FIG. 19, the pressure sensing unit 1 includes a body part 10 and a pressure sensing part 20, the pressure sensing part 20 is fixedly connected with the body part 10, and the limiting part abuts against the upper end of the body part.

In FIG. 14, the pressure sensing unit 1 may be a ceramic capacitance sensor, in this embodiment, the pressure sensing unit 1 includes a body part 10 and a pressure sensing part 20, the body part 10 includes a first end part 11, the pressure sensing part 20 includes a second end part 12, the first end part 11 and the second end part 12 are located on opposite sides of a thickness direction of the pressure sensing unit 1, the circuit unit 4 is located above the first end part 11, in this embodiment, the circuit unit 4 is located in the circuit board, the circuit board is located above the first end part 11, the pressure sensing part is located at the second end part 12. The second end part 12 includes a first area 121 and a second area 122, the first area 121 is a pressure sensitive area, and the second area 122 surrounds an outer edge of the first area 121. The first area 121 is exposed in the detection channel for converting the fluid pressure signal into an electrical signal. The body part 10 has a second groove 113 extending along the thickness direction of the pressure sensing unit 1, the second groove 113 corresponds to the first area 121, the pressure sensing unit 1 further includes a conductive pin, one end of the conductive pin is located in the second groove 113, the conductive pin corresponds to the first area 121 and converts the pressure signal in the detection channel into an electrical signal. The pressure sensing unit 1 further includes a conductive post 14, the conductive post 14 electrically connects the first area 121 with the circuit unit 4, and is used for transmitting the electric signal of the first area 121 to the circuit unit 4.

Figure 15:
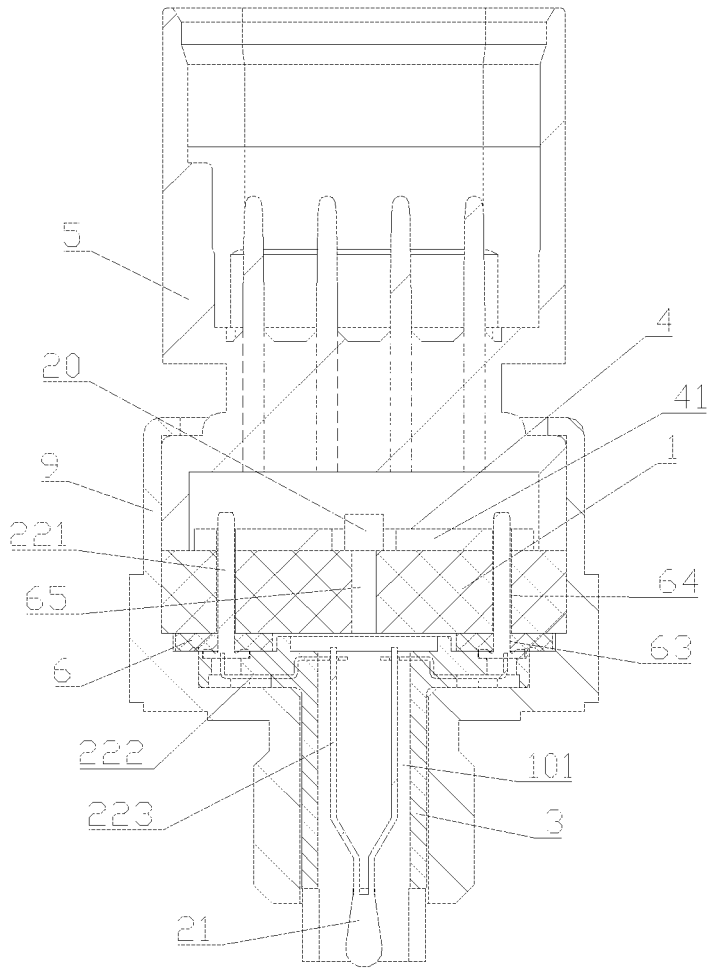
FIG. 15 is a schematic sectional view of the sensor assembly according to a third embodiment of the present application.
Figure 16:
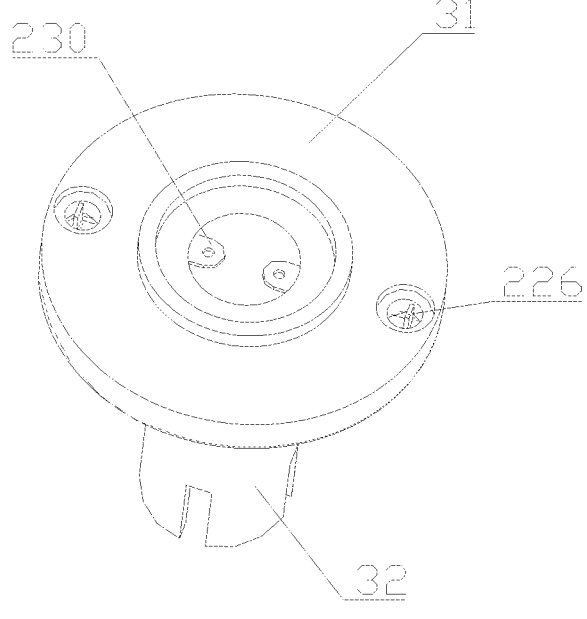
FIG. 16 is a three-dimensional structure diagram of the base in FIG. 15 from a viewing angle.
Figure 17:
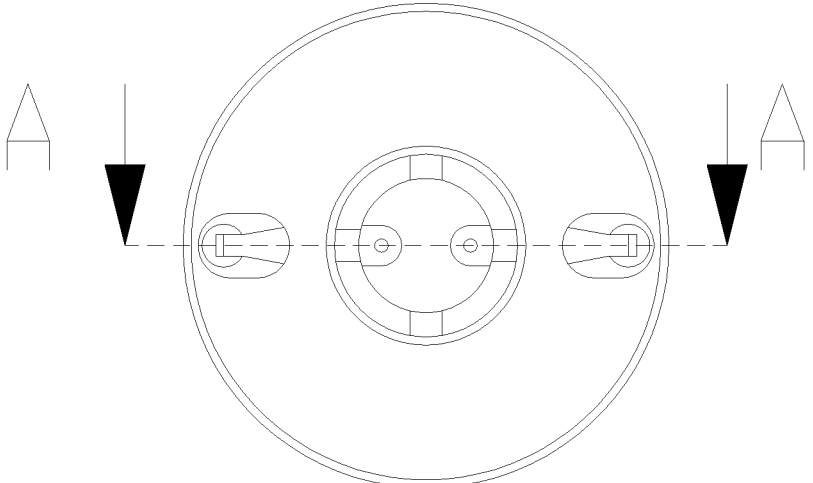
FIG. 17 is a schematic bottom view of the base in FIG. 16.
Figure 18:
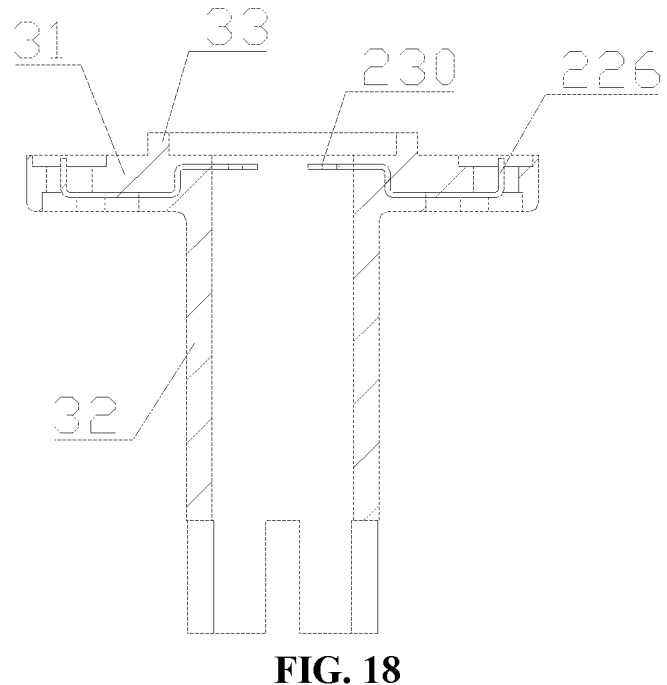
FIG. 18 is a schematic sectional view of FIG. 17 taken along line A-A.

The above pressure sensor may be used in the embodiment in FIG. 15, and the pressure sensing unit 1 has a second through hole 64, the first section 221 of the conductive part 22 is mechanically and electrically connected to the circuit unit 4 through two through holes, namely, the first through hole 63 of the sealing assembly and the second through hole 64 of the pressure sensing unit; the upper end face of the first flange part of the first section 221 abuts against and seals with the lower end face of the sealing part, the pressure sensing unit 1 of this embodiment may also be used in the sensor assembly 100 of the first embodiment; referring to FIG. 4, the lower end face of the first flange part 23 of the first section 221 can be elastically abutted against and electrically connected with the arc-shaped protrusion 220. Of course, the pressure sensing unit of this embodiment may also be used for the sensor assembly 100 of the second embodiment, In conjunction with FIG. 11 to FIG. 13, in this embodiment, the second section 222 is connected with the base 3 by injection molding, one end of the second section 222 has an extension part 224 exposed out of the base, a first groove 225 is formed in the extension part 224, and the first groove 225 is a blind hole. The end of the first section 221 extends into the first groove 225 for axial limit or as a reference for assembly and positioning, and the first section 221 and the second section 222 are connected by welding. The first section 221 and the second section 222 are electrically connected, the dimension of the outer edge of the extension part 224 is larger than the aperture of the first through hole 63, so that the extension part can cover the first through hole 63, the upper end face of the extension part 224 is in sealing contact with the sealing part 62, the lower end face of the extension part 224 is fixed to the base 3 by injection molding. In FIG. 19, the pressure sensing unit 1 is a MEMS (micro electro mechanical system) pressure sensor, which is divided into piezoresistive type and capacitive type, and the two types of pressure sensors are manufactured on the basis of bulk micromachining technology and sacrificial layer technology respectively. The pressure sensing part 20 is a single chip with integrated sensing elements, signal processing, calibration, compensation and microcontroller.

The pressure sensing unit 1 includes a first end part 11 and a second end part 12, the first end part 11 and the second end part 12 are located on opposite sides of the thickness direction of the pressure sensing unit 1, the circuit unit 4 is located above the first end part 11; as shown in FIG. 19, a third through hole 65 is formed in the body part 10, the pressure sensing part 20 is located at one side of the first end part 11, through the third through hole 65, the pressure sensing part can detect the pressure of the fluid in the detection channel. The pressure sensor can be used in the sensor assembly 100 of the third embodiment, the pressure sensing unit 1 has a second through hole 64, the first section 221 of the conductive part is mechanically and electrically connected to the circuit unit 4 through two through holes, namely, the first through hole 63 of the sealing assembly and the second through hole 64 of the pressure sensing unit; the upper end face of the first flange part of the first section abuts against and seals with the lower end face of the sealing part, the detection channel 101 is communicated with the third through hole 65, the sensing film of the pressure sensing part 20 is exposed in the third through hole 65; of course, the pressure sensing unit 1 may also be used in the first and second embodiments. The base 3 takes the second section 222 of the conductive part as an injection molding insert and is molded by an inertmolding process, so as to seal and fix the second section 222 in the base 3.

Figure 20:
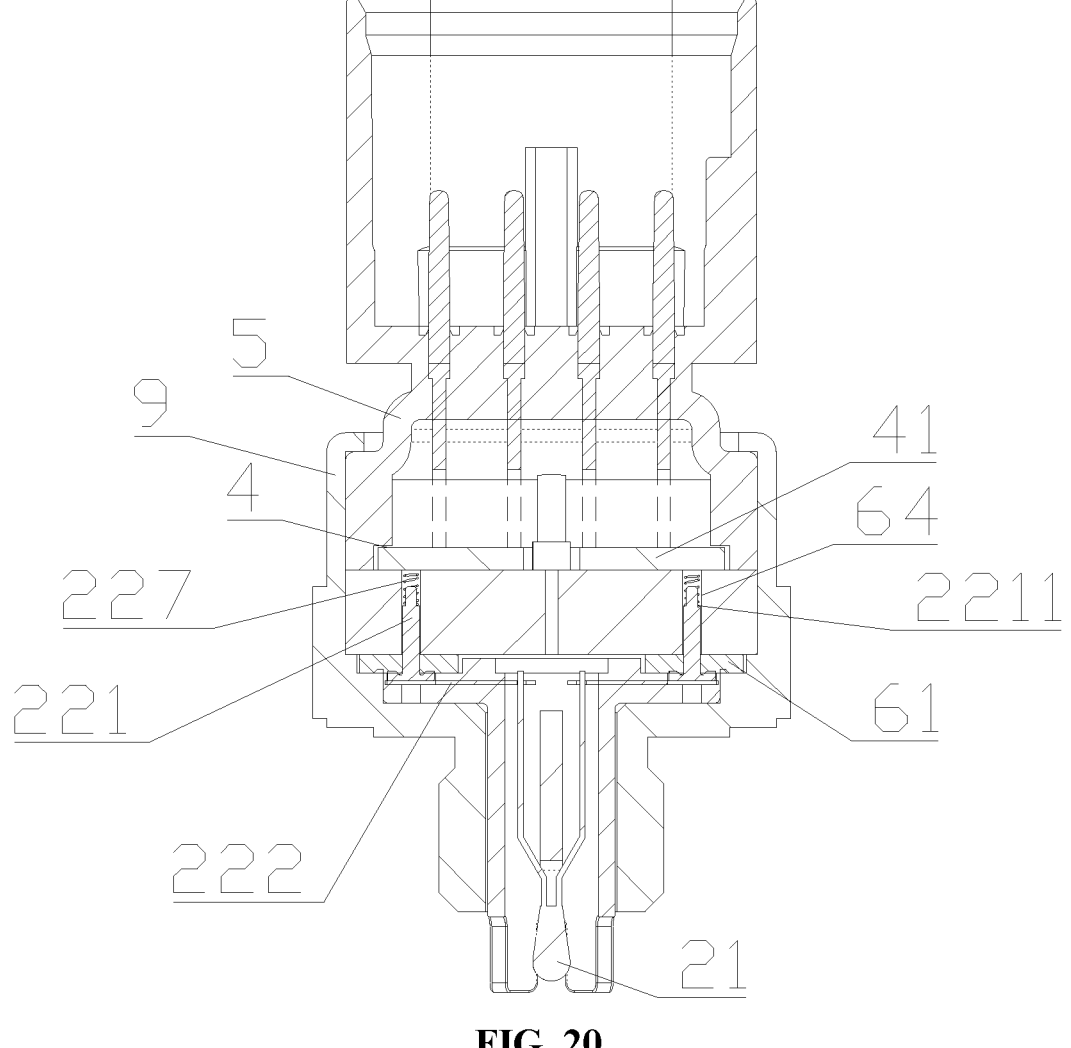
FIG. 20 is a schematic sectional view of the sensor assembly according to a fourth embodiment of the present application.

FIG. 20 is a fourth embodiment of the sensor assembly, the main differences from the third embodiment are as follows: in this embodiment, the conductive part 22 of the temperature sensing part further includes an elastic part 227, the first section 221 is electrically connected with the circuit unit 4 through the elastic part 227; in this embodiment, the elastic part 227 is a spring, the circuit unit 4 is printed on the circuit board 41, the elastic part 227 abuts between the circuit board 41 and the first section 221, the circuit board 41 is provided with pads, the first section 221 is provided with a step part 2211, the elastic part 227 abuts against the pad and the step part 2211, the elastic part 227 is in a compressed state between the pad and the step part; of course, the elastic part can also be welded with one of the pad or the step part and abutted with the other of the pad or the step part. The second section 222 is fixedly connected with the first section 221, the lower end face of the first flange part 23 of the first section 221 is fixed by welding or crimping with the upper end face of the second part. The body part 10 of the pressure sensing unit 1 is a ceramic substrate, the ceramic substrate has a second through hole 64, the elastic part 227 is located in the second through hole 64, which is beneficial to increase the guiding stability of the elastic part.

Figure 21:
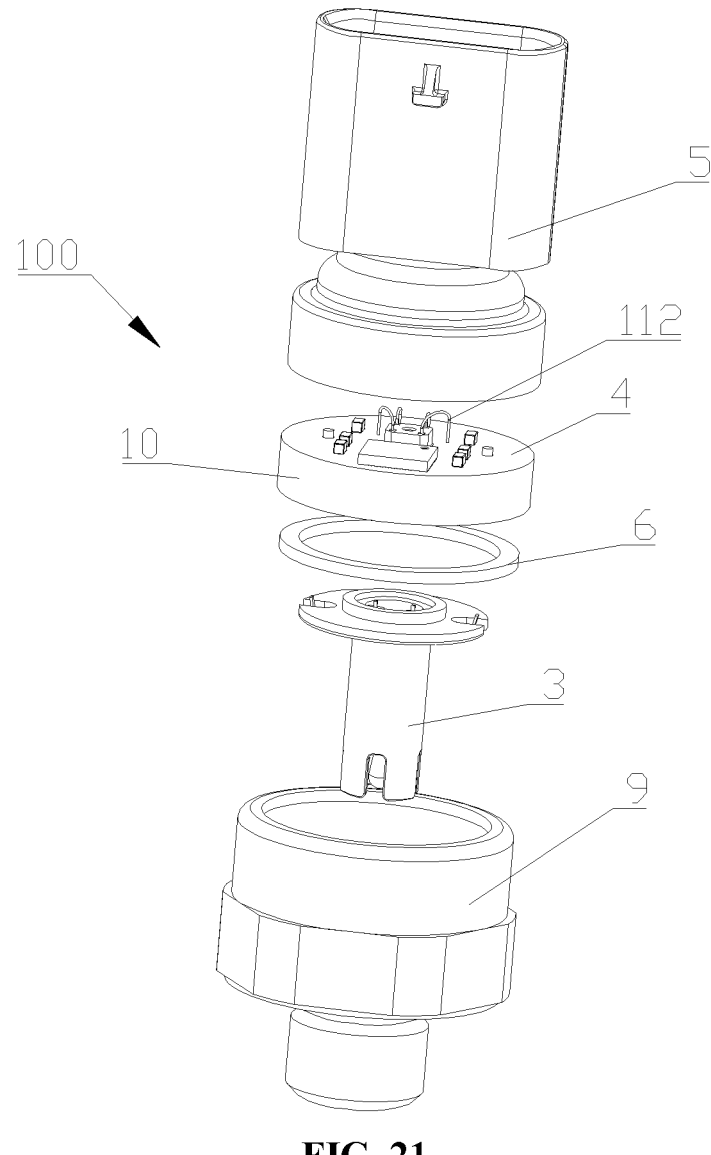
FIG. 21 is an exploded structural diagram of the sensor assembly according to a fifth embodiment of the present application.
Figure 22:
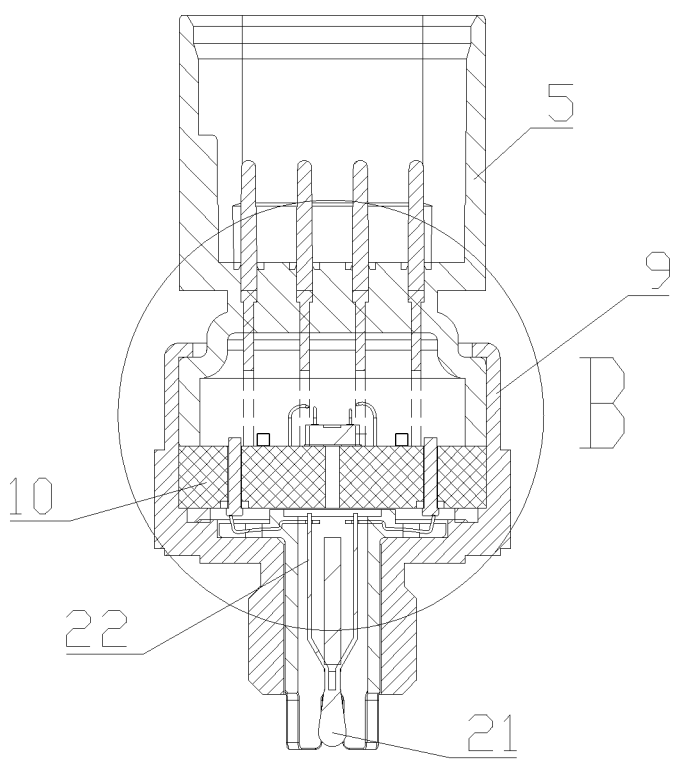
FIG. 22 is a schematic sectional view of the sensor assembly according to the fifth embodiment of the present application.
Figure 23:
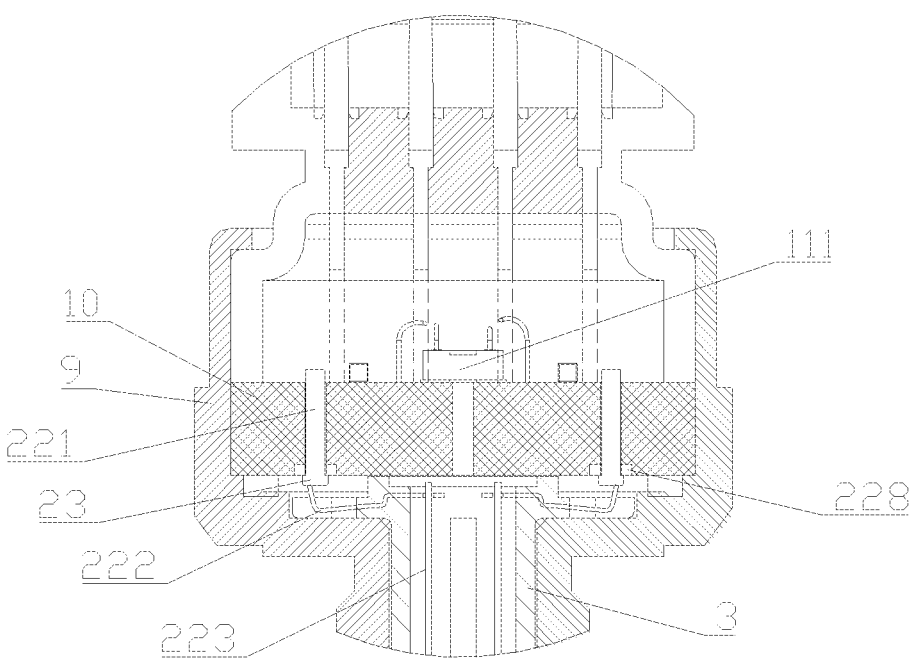
FIG. 23 is a partially enlarged structural diagram of part B in FIG. 22.
Figure 24:
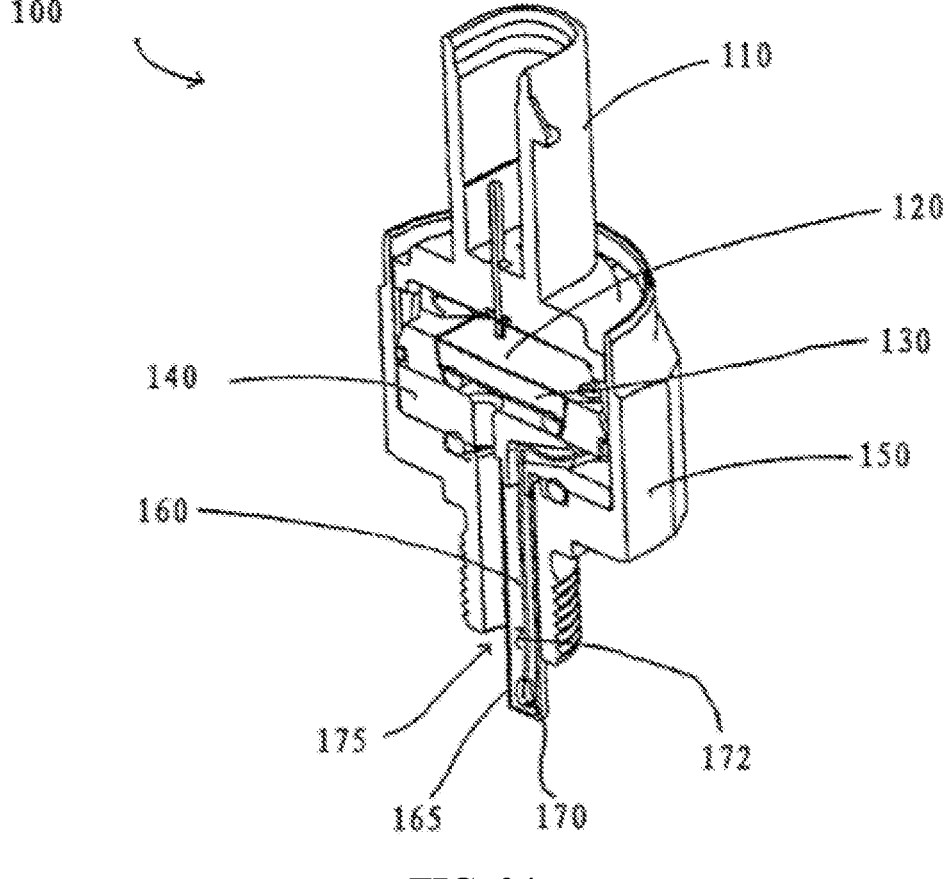
FIG. 24 is a schematic structural view of an embodiment of a sensor assembly in the conventional technology.

FIG. 21 to FIG. 23 are schematic structural views of the fifth embodiment of the sensor assembly; in this embodiment, the sensor assembly 100 includes a shell 9, a temperature sensing unit 2, a pressure sensing unit 1 and a circuit unit 4; both the temperature sensing unit 2 and the pressure sensing unit 1 are electrically connected with the circuit unit 4, the temperature sensing unit 2 includes a temperature sensing part 21, the pressure sensing unit 1 includes a pressure sensing part 11 and a body part 10, the body part 10 is a ceramic substrate, the temperature sensing part 21 can convert the temperature in the detection channel 101 into an electrical signal, the pressure sensing part 11 can convert the pressure in the detection channel 101 into an electrical signal, the pressure sensing unit 1 further includes a metal layer 228, the metal layer 228 is hermetically connected with the ceramic substrate, the pressure sensing part 11 is connected with the ceramic substrate in a limit position, the circuit unit 4 is formed on the ceramic substrate, the conductive part 22 of the temperature sensing unit 2 is electrically connected with the temperature sensing part 21 and the circuit unit 4, the conductive part 22 is fixed with the metal layer 228 by welding; the circuit unit is directly formed by ceramic substrate, and there is no need to set up a separate circuit board.

The pressure sensing unit in this embodiment is a MEMS pressure sensor, the pressure sensing part 11 includes a MEMS sensing part 111 and a transmission part 112, the MEMS sensing part 111 is electrically connected with the circuit unit 4 through the transmission part 112, the ceramic substrate and the metal layer 228 have a second through hole 64, one end of the first section 221 passes through the second through hole 64 and is electrically connected with the circuit unit 4, the other end of the first section 221 is provided with a first flange part 23, an outer diameter of the first flange part 23 is larger than an aperture of the second through hole 64, the upper end face of the first flange part 23 can cover the second through hole 64 and be fixed with the metal layer 228 by welding, the lower end face of the first flange part 23 is electrically connected with the second section 222. The sensor assembly 100 can be mounted on a component with a flow channel, the component can be an electronic expansion valve, which is used to control the refrigerant flow in the vehicle air conditioning system and realize the throttling of refrigerant. As an integrated temperature and pressure sensor, the sensor assembly 100 can be used to detect the pressure and temperature of the refrigerant passing through the flow channel. Of course, the components may also be four-way valves, heat exchangers, components of the fluid pipeline thermal management system, etc., which can measure the pressure and temperature of the refrigerant in the thermal management system components. The similarities with the third embodiment are not described here.

A valve device, which includes a valve body part and a sensor assembly 100, the sensor assembly 100 is fixedly mounted on the valve body part, the valve body part includes a flow channel, and the detection channel 101 of the sensor assembly 100 is communicated with the flow channel. The pressure sensing unit 1 can detect the pressure of the fluid in the flow channel, and the temperature sensing unit 2 can detect the temperature of the fluid in the flow channel.

It should be noted that the above embodiments are merely used to illustrate the present application and not to limit the technical solutions described in the present application. Although the present application has been described herein in detail with reference to the above embodiments, those of ordinary skill in the art should understand that those skilled in the art may still modify or equivalently replace the present application, and all technical solutions and its improvements that do not apart from the spirit and scope of the present application should be covered by the scope of the claims of the present application.

What is claimed is:

1. A sensor assembly, comprising a shell, a temperature sensing unit, a pressure sensing unit, a circuit unit and a sealing assembly, wherein the temperature sensing unit comprises a temperature sensing part, the pressure sensing unit comprises a pressure sensing part, the sensor assembly has a detection channel, the temperature sensing part, which is located in the detection channel, is configured to convert the temperature in the detection channel into an electrical signal, the pressure sensing part is configured to convert the pressure in the detection channel into an electrical signal; the temperature sensing unit further comprises a conductive part, the conductive part is electrically connected with the temperature sensing part and the circuit unit, the sensor assembly further comprises a connector, the connector comprises a contact pin and a connector housing, the contact pin is electrically connected with the circuit unit, the shell is fixedly connected with the connector housing, the pressure sensing unit is limited between a bottom wall of the shell and the connector housing, the connector housing comprises a limiting part, the limiting part is configured to abut against an upper end face of the pressure sensing unit, the sealing assembly has a first through hole, the temperature sensing part is electrically connected with the circuit unit through the conductive part, the conductive part comprises a first section, and, an end of the first section passes through the first through hole and is electrically connected with the circuit unit.

2. The sensor assembly according to claim 1, wherein the sealing assembly is located between the shell and the pressure sensing unit; the sealing assembly comprises a sealing part, the sealing part is pressed between the pressure sensing unit and the shell, and is in sealing contact with pressure sensing unit and the shell.

3. The sensor assembly according to claim 2, wherein the temperature sensing unit further comprises a base, the base is in a limit connection with the shell, the temperature sensing part is located in an inner cavity formed by the base, the detection channel comprises the inner cavity formed by the base, the conductive part comprises a first section, a second section and a third section, the first section is directly connected with the circuit unit, the second section is connected with the base by injection molding, the second section is in contact with and electrically connected with the first section, the third section is fixedly connected with the temperature sensing part, the third section is fixed with the second section by welding; the shell is fixed with the connector housing by riveting.

4. The sensor assembly according to claim 3, wherein the sealing assembly has a first through hole, the pressure sensing unit has a second through hole, one end of the first section of the conductive part passes through the first through hole and the second through hole and is electrically connected with the circuit unit, a first flange part is formed at the other end of the first section, an outer diameter of the first flange part is larger than an aperture of the first through hole, the first flange part covers the first through hole.

5. The sensor assembly according to claim 4, wherein the sealing assembly further comprises a metal framework, the sealing part is formed by injection molding with the metal framework as an insert, and the metal framework is annular; in a radial direction of the sealing assembly, an outer edge of the metal framework is aligned with an outer edge of the sealing part, along a height direction of the sealing assembly, the sealing part protrudes from the surface of the metal framework, part of the pressure sensing unit contacts with the metal framework after compressing the sealing part, the metal framework presses the sealing part against the bottom wall of the shell.

6. The sensor assembly according to claim 4, wherein an upper end face of the pressure sensing unit abuts against the connector housing, a lower end face of the pressure sensing unit compresses the sealing part and then abuts against the shell, an upper end face of the sealing part is abutted against and hermetically connected with the lower end face of the pressure sensing unit, a lower end face of the sealing part is hermetically connected with the shell.

7. The sensor assembly according to claim 3, wherein the shell has a first step part and a second step part, the first step part and the second step part are located at the bottom wall of the shell, the first step part has a first step surface, the second step part has a second step surface, the first step surface is closer to the pressure sensing unit than the second step surface, the lower end face of the sealing part is hermetically connected with the first step surface, the second step part is provided with a mounting hole, the second flange part abuts against the second step surface, the second flange part is limited by a side wall of the second step part, part of the base is located in the mounting hole.

8. The sensor assembly according to claim 3, wherein the sealing assembly further comprises a metal framework, the sealing part is formed by injection molding with the metal framework as an insert, and the metal framework is annular; in a radial direction of the sealing assembly, an outer edge of the metal framework is aligned with an outer edge of the sealing part, along a height direction of the sealing assembly, the sealing part protrudes from the surface of the metal framework, part of the pressure sensing unit contacts with the metal framework after compressing the sealing part, the metal framework presses the sealing part against the bottom wall of the shell.

9. The sensor assembly according to claim 3, wherein an upper end face of the pressure sensing unit abuts against the connector housing, a lower end face of the pressure sensing unit compresses the sealing part and then abuts against the shell, an upper end face of the sealing part is abutted against and hermetically connected with the lower end face of the pressure sensing unit, a lower end face of the sealing part is hermetically connected with the shell.

10. The sensor assembly according to claim 2, wherein the temperature sensing unit further comprises a base, the base is in a limit connection with the shell, the temperature sensing part is located in an inner cavity formed by the base, the detection channel comprises the inner cavity formed by the base, the sealing assembly further comprises a metal framework, the sealing part is formed by injection molding with the metal framework as an insert, and the metal framework is annular; in a radial direction of the sealing assembly, an outer edge of the metal framework is aligned with an outer edge of the sealing part, along a height direction of the sealing assembly, the sealing part protrudes from the surface of the metal framework, part of the pressure sensing unit contacts with the metal framework after compressing the sealing part, the metal framework presses the sealing part against the bottom wall of the shell.

11. The sensor assembly according to claim 10, wherein a main material of the sealing part is rubber material, a first flange part is formed at the other end of the first section, an outer diameter of the first flange part is larger than an aperture of the first through hole.

12. The sensor assembly according to claim 10, wherein the shell is fixed with the connector housing by riveting, the base has a second flange part, an upper end face of the second flange part abuts against a lower end face of the sealing assembly, a lower end face of the second flange part is in contact with a bottom wall of the shell, an upper end face of the sealing assembly is abutted against the lower end face of the pressure sensing unit.

13. The sensor assembly according to claim 10, wherein the sensor assembly comprises a circuit board, the circuit unit is printed on the circuit board, the limiting part is configured to also abut against an upper end face of the circuit board, the pressure sensing unit comprises a body part, the pressure sensing unit is fixedly connected with the body part, a lower end face of the circuit unit abuts against an upper end face of the body part, the shell is fixed with the connector housing by riveting, the base has a second flange part, an upper end face of the second flange part abuts against a lower end face of the sealing assembly, a lower end face of the second flange part is in contact with a bottom wall of the shell, an upper end face of the sealing assembly is abutted against the lower end face of the body part.

14. The sensor assembly according to claim 2, wherein an upper end face of the pressure sensing unit abuts against the connector housing, a lower end face of the pressure sensing unit compresses the sealing part against the shell, an upper end face of the sealing part is abutted against and hermetically connected with the lower end face of the pressure sensing unit, a lower end face of the sealing part is hermetically connected with the shell.

15. The sensor assembly according to claim 14, wherein a main material of the sealing part is rubber material, a first flange part is formed at the other end of the first section, an outer diameter of the first flange part is larger than an aperture of the first through hole.

16. The sensor assembly according to claim 1, wherein the pressure sensing unit further comprises a body part, the body part is fixedly connected with the pressure sensing part, the body part comprises a ceramic substrate and a metal layer, the metal layer is hermetically connected with the ceramic substrate, the pressure sensing part is connected with the ceramic substrate in a limit position, the circuit unit is formed on the ceramic substrate, the conductive part is fixed with the metal layer by welding.

17. The sensor assembly according to claim 16, wherein the pressure sensing unit is a MEMS pressure sensing unit, the pressure sensing part comprises a MEMS sensing part and a transmission part, the MEMS sensing part is electrically connected with the circuit unit through the transmission part, the conductive part comprises a first section and a second section, the ceramic substrate and the metal layer have a through hole, an end of the first section passes through the through hole and is electrically connected with the circuit unit, the other end of the first section is provided with a first flange part, an outer diameter of the first flange part is larger than an aperture of the through hole, the upper end face of the first flange part covers the through hole and be fixed with the metal layer by welding, the lower end face of the first flange part is electrically connected with the second section.

18. The sensor assembly according to claim 17, wherein the base further comprises a limit ring, there is a gap between the upper end face of the limit ring and the lower end face of the pressure sensing unit, the sealing part is annular, and is located between the limit ring and the side wall of the shell.

* * * * *